United States Patent
Bishop (10) Patent No.: US 12,247,891 B2
(45) Date of Patent: Mar. 11, 2025

(54) TEMPERATURE ISOLATOR SYSTEMS AND METHODS FOR THE ASSEMBLY THEREOF

(71) Applicant: Haygor Instrument & Company, Inc., Houston, TX (US)

(72) Inventor: Allen Bishop, Missouri City, TX (US)

(73) Assignee: HAYGOR INSTRUMENT & COMPANY, INC., Houston, TX (US)

( * ) Notice: Subject to any disclaimer, the term of this patent is extended or adjusted under 35 U.S.C. 154(b) by 0 days.

(21) Appl. No.: 18/783,232

(22) Filed: Jul. 24, 2024

(65) Prior Publication Data

US 2024/0377276 A1    Nov. 14, 2024

Related U.S. Application Data

(63) Continuation of application No. PCT/US2023/012023, filed on Jan. 31, 2023.

(60) Provisional application No. 63/305,981, filed on Feb. 2, 2022.

(51) Int. Cl.
*G01L 19/06* (2006.01)
*C22C 28/00* (2006.01)

(52) U.S. Cl.
CPC .......... *G01L 19/0681* (2013.01); *C22C 28/00* (2013.01); *G01L 19/0645* (2013.01)

(58) Field of Classification Search
CPC .. G01L 19/0681; G01L 19/0645; C22C 28/00
See application file for complete search history.

(56) References Cited

U.S. PATENT DOCUMENTS

| 7,036,381 | B2 * | 5/2006 | Broden | G01L 19/0681 73/708 |
| 7,258,021 | B2 * | 8/2007 | Broden | G01L 19/0681 73/756 |
| 7,373,831 | B2 * | 5/2008 | Broden | G01L 19/0645 73/753 |
| 7,497,123 | B1 * | 3/2009 | Behm | F28F 13/00 73/706 |
| 9,274,018 | B2 * | 3/2016 | Miller | G01L 19/0618 |
| 10,129,975 | B1 * | 11/2018 | Tabor | C22C 28/00 |

(Continued)

FOREIGN PATENT DOCUMENTS

CN    215003819 U    12/2021
WO   2023150127 A2    8/2023

OTHER PUBLICATIONS

International Preliminary Report on Patentability and Written Opinion (IPRP), from Application No. PCT/US2023/012023, Aug. 15, 2024, 7 pages.

(Continued)

*Primary Examiner* — Freddie Kirkland, III
(74) *Attorney, Agent, or Firm* — William R. Childs; Childs Patent Law PLLC (57) ABSTRACT

A system for protecting a pressure measuring instrument from high temperatures is disclosed herein. The system can include a diaphragm seal, a liquid metal alloy, a temperature isolator, and an isolator diaphragm. Methods of assembling the system are also presented. A benefit of the systems and methods disclosed herein can include protecting pressure measuring instruments from high temperatures as well as other adverse conditions.

14 Claims, 6 Drawing Sheets

(56) References Cited

U.S. PATENT DOCUMENTS

| | | | | |
|---|---|---|---|---|
| 2005/0284227 | A1* | 12/2005 | Broden | G01L 19/0681 |
| | | | | 73/708 |
| 2006/0162458 | A1* | 7/2006 | Broden | G01L 13/025 |
| | | | | 73/708 |
| 2006/0162459 | A1* | 7/2006 | Broden | G01L 9/025 |
| | | | | 73/715 |
| 2006/0226738 | A1* | 10/2006 | Kurtz | G01L 9/006 |
| | | | | 310/338 |
| 2007/0289388 | A1* | 12/2007 | Kurtz | G01L 9/0055 |
| | | | | 73/727 |
| 2014/0090476 | A1* | 4/2014 | Miller | G01L 19/0681 |
| | | | | 73/706 |

OTHER PUBLICATIONS

International Search Report and Written Opinion for Application No. PCT/US23/12023, dated May 26, 2023, 8 pages.

* cited by examiner

TEMPERATURE ISOLATOR SYSTEMS AND METHODS FOR THE ASSEMBLY THEREOF

CROSS-REFERENCE TO RELATED APPLICATIONS

This application claims priority to and is a continuation of PCT Application No. PCT/US23/12023 filed on Jan. 31, 2023, which claims priority to U.S. Provisional Application No. 63/305,981, filed on Feb. 2, 2022, the entirety of which are incorporated by reference.

TECHNICAL FIELD

A system for protecting a pressure measuring instrument from high temperatures is disclosed herein. The system can include a diaphragm seal, a liquid metal alloy, a temperature isolator, and an isolator diaphragm. Methods of assembling the system are also presented. A benefit of the systems and methods disclosed herein can include protecting pressure measuring instruments from high temperatures of 400° C. or more as well as other adverse conditions.

BACKGROUND

One of the most critical measurements for any liquid process can be the measurement of pressure inside of pipes and other vessels. If the pressure inside the pipe is too low, then the liquid or slurry inside the pipe will not be adequately conducted by the pipe from one location to another. If the pressure inside the pipe is too high, then it presents a tremendous safety risk because the pipe or one of its joints may fail, potentially injuring workers and spilling its contents out into the environment.

Pressure measuring instruments have been developed for the purpose of measuring the pressure inside pipes and vessels. These pressure measuring instruments rely on the ability of one or more sensors to sense the pressure of the liquid or slurry inside the pipe, which means that the liquid has to, directly or indirectly, press against the sensors of the pressure measuring instrument.

However, what happens if direct contact of the pressure measuring instrument with the liquid or slurry would tend to damage or degrade the pressure measuring instrument? For example, many liquids or slurries that need move through pipes can be corrosive, such as acids or bases; may be fouling, such as sewage; may be prone to clogging, such as with oilfield production; or may have an excessively high temperature, such as encountered in industrial distillations, chemical plants, or oilfield drilling and production.

Diaphragm seals are used to provide a buffer or intermediate between the liquid in a pipe and the sensors of the pressure measuring instrument. As the liquid in the pipe presses against the diaphragm seal, the diaphragm seal passes or transmits that pressure from the pipe to the pressure measuring instrument without the pressure measuring instrument ever making direct contact with the liquid in the pipe. If the diaphragm seal is damaged by the liquid, then it is usually faster, easier, and less expensive to replace the diaphragm seal than the pressure measuring instrument or its sensors. Diaphragm seals are sometimes referred to as chemical isolators or temperature isolators, depending on their design and function.

As scientists, engineers, manufacturers, and oilfield producers seek to measure the pressure of liquids under more and more damage conditions, then sealing systems must be developed which can endure and function under more and more extreme conditions. There is a need for diaphragm seals and diaphragm seal systems that can function under high temperatures, including temperatures of 400° C. or more. There is a need for diaphragm seal systems that can function under high temperatures of 400° C. or more and are compatible with, or can be integrated into, existing technology.

SUMMARY

A system for protecting a pressure measuring instrument from a high temperature is disclosed herein. In some embodiments, the system includes a pressure measuring instrument, a diaphragm seal, and a temperature isolator, wherein the diaphragm seal contains a proximate diaphragm, wherein the temperature isolator contains an isolator diaphragm, wherein the diaphragm seal is operatively connected to the isolator diaphragm by a liquid metal alloy in a liquid metal alloy channel, and the isolator diaphragm is operatively connected to the pressure measuring instrument by a non-metal liquid in a non-metal liquid channel. In some embodiments of the system, the diaphragm seal contains a liquid metal fill port connected to the liquid metal alloy channel and a diaphragm portion of the liquid metal alloy channel extends from the proximate diaphragm to the temperature isolator. In some embodiments of the system, the temperature isolator contains an isolator cooling tower, a non-metal liquid fill cylinder, and the isolator diaphragm, wherein the isolator diaphragm is sealed between a sealing face of the isolator cooling tower and a sealing face of the non-metal liquid fill cylinder. In some embodiments of the system, the isolator cooling tower contains an isolator portion of the liquid metal alloy channel containing the liquid metal alloy, wherein an internal diameter of the isolator portion of the liquid metal alloy channel in the isolator cooling tower is from about 3.0 mm to about 13.0 mm, or wherein the isolator cooling tower has a series of isolator cooling ridges on an outer surface of the isolator cooling tower and the isolator cooling ridges have a height of from about 6.0 mm to about 17.0 mm and a spacing between the cooling ridges of from about 1.2 mm to about 7.0 mm, and wherein an isolator thickness of the isolator cooling tower from the isolator portion of the liquid metal alloy channel to a bottom of the isolator cooling ridges is from about 25.0 mm to about 75.0 mm; or wherein the isolator cooling tower has a length of from about 25.0 mm to about 105.0 mm. In some embodiments of the system, the non-metal liquid fill cylinder contains an isolator portion of the non-metal liquid channel containing the non-metal liquid, and wherein an internal diameter of the isolator portion of the non-metal liquid channel in the non-metal liquid fill cylinder is from about 0.10 mm to about 13.0 mm, or wherein the isolator portion of the non-metal liquid channel is connected to a non-metal liquid fill port. In some embodiments of the system, the isolator diaphragm is made of an isolator diaphragm material, and the isolator diaphragm material includes a steel alloy, a nickel alloy, a silver alloy, a tantalum alloy, a titanium alloy, or a zirconium alloy, or a combination or alloy thereof; or wherein the isolator diaphragm has a thickness of from about 0.02 mm to about 0.25 mm. In some embodiments of the system, the liquid metal alloy includes: from about 65.0% to about 75.0% gallium by weight and from about 15.0% to about 25.0% indium by weight, based on a total weight of the liquid metal alloy; or from about 65.0% to about 75.0% gallium by weight and about 5.0% to about 15.0% tin by weight, based on a total weight of the liquid metal alloy; or from about 15.0% to about 25.0% indium by weight and about 5.0% to about 15.0% tin by weight, based on a total weight of the liquid metal alloy; or wherein the liquid metal alloy includes gallium, indium, and tin, or a combination or alloy thereof. In some embodiments, the system includes an instrument cooling tower, wherein the instrument cooling tower is located between the temperature isolator and the pressure measuring instrument, and the instrument cooling tower contains the non-metal liquid in a tower portion of the non-metal liquid channel, and wherein the tower portion of the non-metal liquid channel operatively connects the temperature isolator to the pressure measuring instrument; or wherein a tower internal diameter of the tower portion of the non-metal liquid channel in the instrument cooling tower is from about 3.0 mm to about 13.0 mm; or wherein the instrument cooling tower has a series of tower cooling ridges on an outer surface and the tower cooling ridges have a height of from about 6.0 mm to about 17.0 mm, and wherein a thickness of the instrument cooling tower from the tower portion of the non-metal liquid channel to a bottom of the tower cooling ridges is from about 25.0 mm to about 75.0 mm; or wherein the instrument cooling tower has a length of from about 25.0 mm to about 105.0 mm. In some embodiments of the system, the temperature isolator connects directly to the pressure measuring instrument; or further comprising a metal fitting, a metal adapter, or a capillary metal line, wherein the capillary metal line includes a metal tubing, wherein the metal fitting, the metal adapter, or the capillary metal line, contains a spacer portion of the non-liquid metal channel and operatively connects the non-metal liquid of the temperature isolator to the pressure measuring instrument.

A method of assembling a system for protecting a pressure measuring instrument from a high temperature. In some embodiments, the method includes providing the pressure measuring instrument, a diaphragm seal, and a temperature isolator, wherein the diaphragm seal contains a proximate diaphragm, wherein the temperature isolator contains an isolator diaphragm, wherein the diaphragm seal is operatively connected to the isolator diaphragm by a liquid metal alloy channel, and the isolator diaphragm is operatively connected to the pressure measuring instrument by a non-metal liquid channel; and forming the system for protecting a pressure measuring instrument by, in any order, adding a liquid metal alloy to the liquid metal alloy channel, and adding a non-metal liquid to the non-metal liquid channel. In some embodiments, the method includes, before adding the liquid metal alloy or the non-metal liquid, providing the pressure measuring instrument; providing a diaphragm seal, wherein the diaphragm seal contains a diaphragm portion of a liquid metal alloy channel; providing an isolator cooling tower, wherein isolator cooling tower contains an isolator portion of a liquid metal alloy channel that extends from a sealing face of the isolator cooling tower through the isolator cooling tower to a diaphragm-side sealing face; providing a non-metal liquid fill cylinder, wherein the non-metal liquid fill cylinder contains an isolator portion of a non-metal liquid channel that extends from a sealing face of the non-metal liquid fill cylinder through non-metal liquid fill cylinder to an instrument-side sealing face; providing an isolator diaphragm; forming a temperature isolator by sealing the isolator diaphragm between the sealing face of the non-metal liquid fill cylinder and the sealing face of the isolator cooling tower. In some embodiments, the method includes, before, during, or after forming the temperature isolator, connecting the isolator portion of a liquid metal alloy channel to the diaphragm portion of the liquid metal alloy channel; and connecting the isolator portion of the non-metal liquid channel to the pressure measuring instrument, directly or indirectly.

BRIEF DESCRIPTION OF THE DRAWINGS

The foregoing summary, as well as the following detailed description of the embodiments, will be better understood when read in conjunction with the attached drawings. For the purpose of illustration, there are shown in the drawings some embodiments, which may be preferable. It should be understood that the embodiments depicted are not limited to the precise details shown. Unless otherwise noted, the drawings are not to scale.

DETAILED DESCRIPTION

Unless otherwise noted, all measurements are in standard metric units.

Unless otherwise noted, all instances of the words "a," "an," or "the" can refer to one or more than one of the word that they modify.

Unless otherwise noted, the phrase "at least one of" means one or more than one of an object. For example, "at least one of a pressure measuring instrument, a diaphragm seal, and a temperature isolator" means a single pressure measuring instrument, more than one pressure measuring instrument, a single diaphragm seal, more than one diaphragm seal, a single measuring instrument, more than one measuring instrument, or any combination thereof.

Unless otherwise noted, the term "about" refers to +10% of the non-percentage number that is described, rounded to the nearest whole unit of measurement for the non-percentage number. For example, about 105 mm, would include 95 to 116 mm because the non-percentage number is shown to an accuracy of a whole number, it is rounded to the nearest whole number. Similarly, if the non-percentage number is shown accurate to an accuracy of a tenth, such as 105.3, then the number would include 94.8 to 115.8, because it is rounded to the nearest whole tenth. Unless otherwise noted, the term "about" refers to +5% of a percentage number. For example, about 20% by weight would include 15 to 25% by weight. When the term "about" is discussed in terms of a range, then the term refers to the appropriate amount less than the lower limit and more than the upper limit. For example, from about 100 mm to about 200 mm would include from 90 to 220 mm.

Unless otherwise noted, the term "operatively connected" means connected in such a way that pressure exerted against a diaphragm is conducted or passed through a liquid medium (when present) to exert pressure against another object, wherein the object is closer to the pressure measuring instrument. For example, if pressure exerted against the proximate diaphragm is conducted to or through the liquid metal alloy to exert pressure against the isolator diaphragm, then the proximate diaphragm or proximate diaphragm seal would be said to be "operatively connected" to the isolator diaphragm. Similarly, if the liquid metal alloy channel is connected from the proximate diaphragm to the isolator diaphragm as soon as the liquid metal alloy is added to the channel, then that would also be "operatively connected." In contrast, if there were a misalignment of the liquid metal alloy channel, a blockage of the liquid metal alloy channel, or a large unsealed-opening in the liquid metal alloy channel, such that pressure exerted against the proximate diaphragm was incapable of exerting pressure through the liquid alloy metal (when present) against the isolator diaphragm, then the proximate diaphragm seal and the isolator diaphragm would not be "operatively connected."

Unless otherwise noted, the term "high temperature" or "high temperatures" means a temperature of from about 400° C. to about 1,000° C.

Unless otherwise noted, properties (height, width, length, ratio etc.) as described herein are understood to be averaged measurements.

Figure 1:
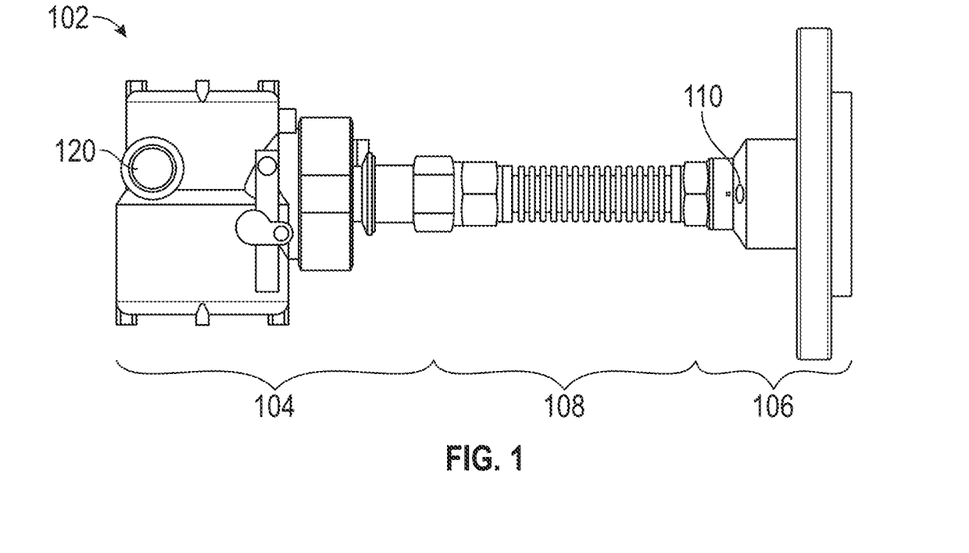
FIG. 1 is a schematic depiction of a conventional diaphragm seal system that includes a diaphragm seal attached to a pressure measuring device through a cooling tower, shown from a top view.
Figure 2:
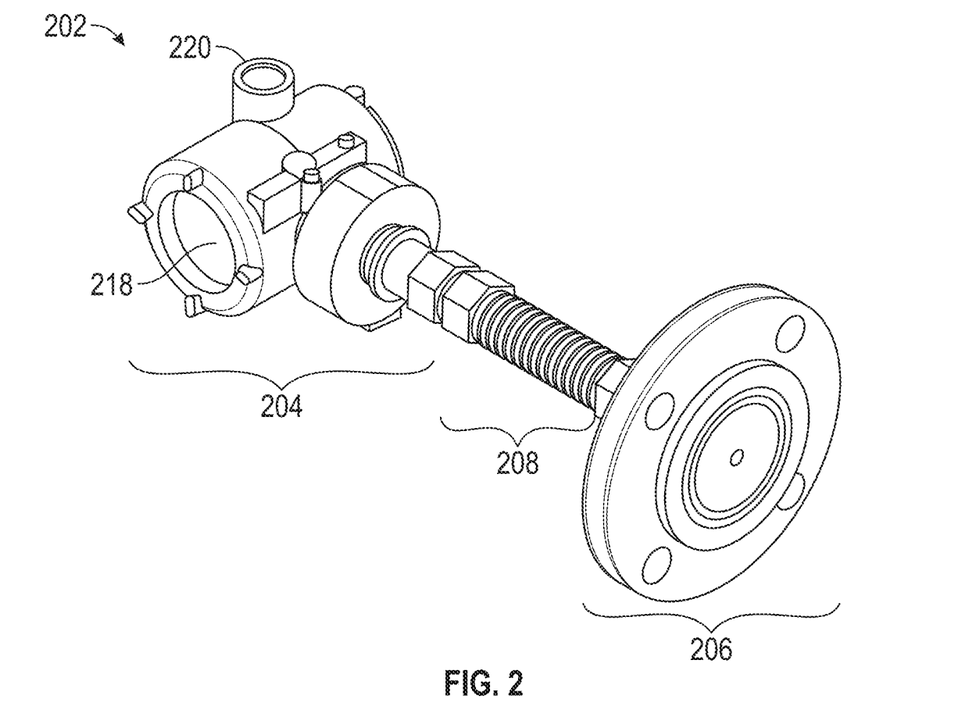
FIG. 2 is a schematic depiction of the conventional diaphragm seal system of FIG. 1, shown from an off-axis view.

Referring to FIG. 1 and FIG. 2, in a conventional diaphragm seal system for protecting a pressure measuring instrument from high temperatures, the conventional diaphragm system 102, 202 includes a pressure measuring instrument 104, 204, a diaphragm seal 106, 206, and a cooling tower 108, 208. The pressure measuring instrument often has a pressure display 218 and electrical ports 120, 220, where the pressure measuring instrument can be connected to power and other electrical and/or communication systems.

Figure 3:
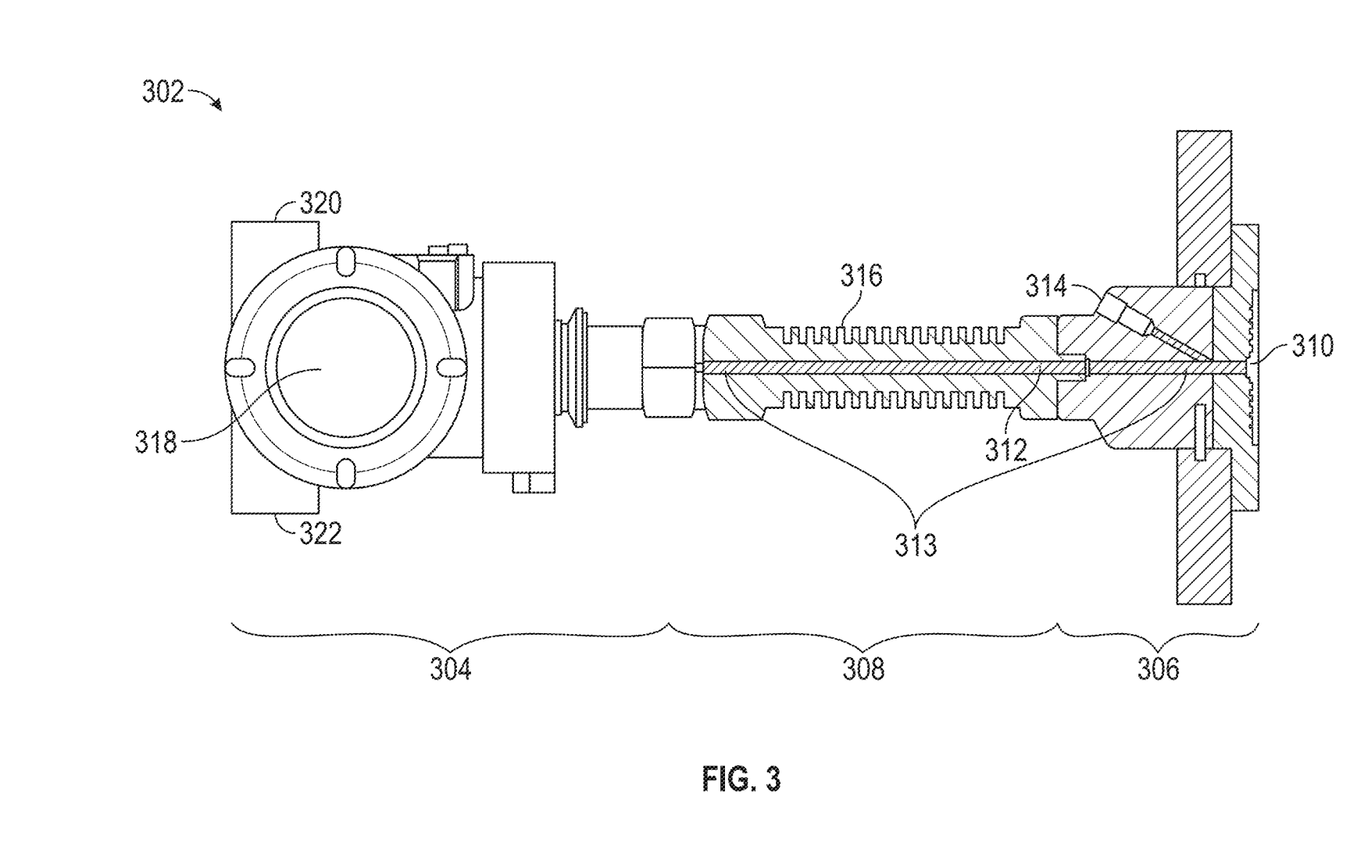
FIG. 3 is a schematic depiction of the conventional diaphragm seal system of FIG. 1, shown with a cut away view of the diaphragm seal and the cooling tower.

In more detail, referring to FIG. 3, the conventional diaphragm seal system 302 includes a pressure measuring instrument 304, a conventional diaphragm seal 306, and a cooling tower 308. In a conventional diaphragm seal system for reducing excess temperatures, the liquid exerts a pressure against a diaphragm 310 of the diaphragm system, the diaphragm exerts a pressure against a fill fluid 312, which is usually an oil or oil-based fluid. The fill fluid occupies a fill fluid channel 313, wherein the fill fluid channel extends from the diaphragm of the diaphragm seal through a cooling tower and directly to the pressure measuring instrument. As pressure is exerted by the diaphragm on the fill fluid, the fill fluid gets pushed down the fill fluid channel and exerts pressure against the pressure measuring instrument, such that the pressure measuring instrument indirectly measures the pressure against the diaphragm of the diaphragm seal. The cooling tower usually has suitable length and cooling ridges 316 on the surface of the cooling tower to dissipate the heat of the fill fluid extending along the length of the fill fluid channel. In practice, the fill fluid can be added or replaced using a fill port 314. In FIG. 3, the pressure display 318 and electrical ports 320, 322 are shown from different angles.

Conventional diaphragm seal systems, such as the ones depicted in FIGS. 1, 2, and 3, can safely measure the pressure of liquids in pipes or vessels having a temperature of less than 400 degrees Celsius. However, conventional diaphragm seal systems are limited by the temperature limitations of the fill fluid itself. Fill fluids are typically petroleum-based oils or hydrocarbons that will suffer vaporization, ignition, or diaphragm system rupture when used with temperatures of 400 degrees Celsius or more. Therefore, if the temperature of the liquids being measured passes above 400 degrees Celsius, then fill fluid is compromised inside the fill fluid channel, which leads to errors in pressure measurement, safety concerns, and usually requires that one or more of the components of the conventional diaphragm seal system be replaced, which can be costly in terms of the cost of the materials and employee time. Worse, if the compromise fill fluid is not detected in time, then the errors in pressure measurement can lead to catastrophic failure of the pipe or vessels, which can injure workers and spill the hot contents of the pipe or vessel into the environment.

There is a need to safely measure the pressure of hot liquids in pipes or vessels having a temperature of 400 degrees Celsius or more. An ideal solution would be one that is capable of being used with or integrated into existing technology.

A system for protecting a pressure measuring instrument from a high temperature of over 400 degrees Celsius has been discovered. It has been discovered that it is possible to transform a conventional diaphragm seal system into a diaphragm seal system capable of functioning at high temperatures of 400 degrees Celsius or more by incorporating or integrating a temperature isolator and a liquid metal alloy into the system, such that the temperature isolator and the liquid metal alloy act as a temperature buffer or temperature barrier between the diaphragm seal exposed to the high temperatures and a standard fill fluid or non-metal liquid.

Figures 4, 5:
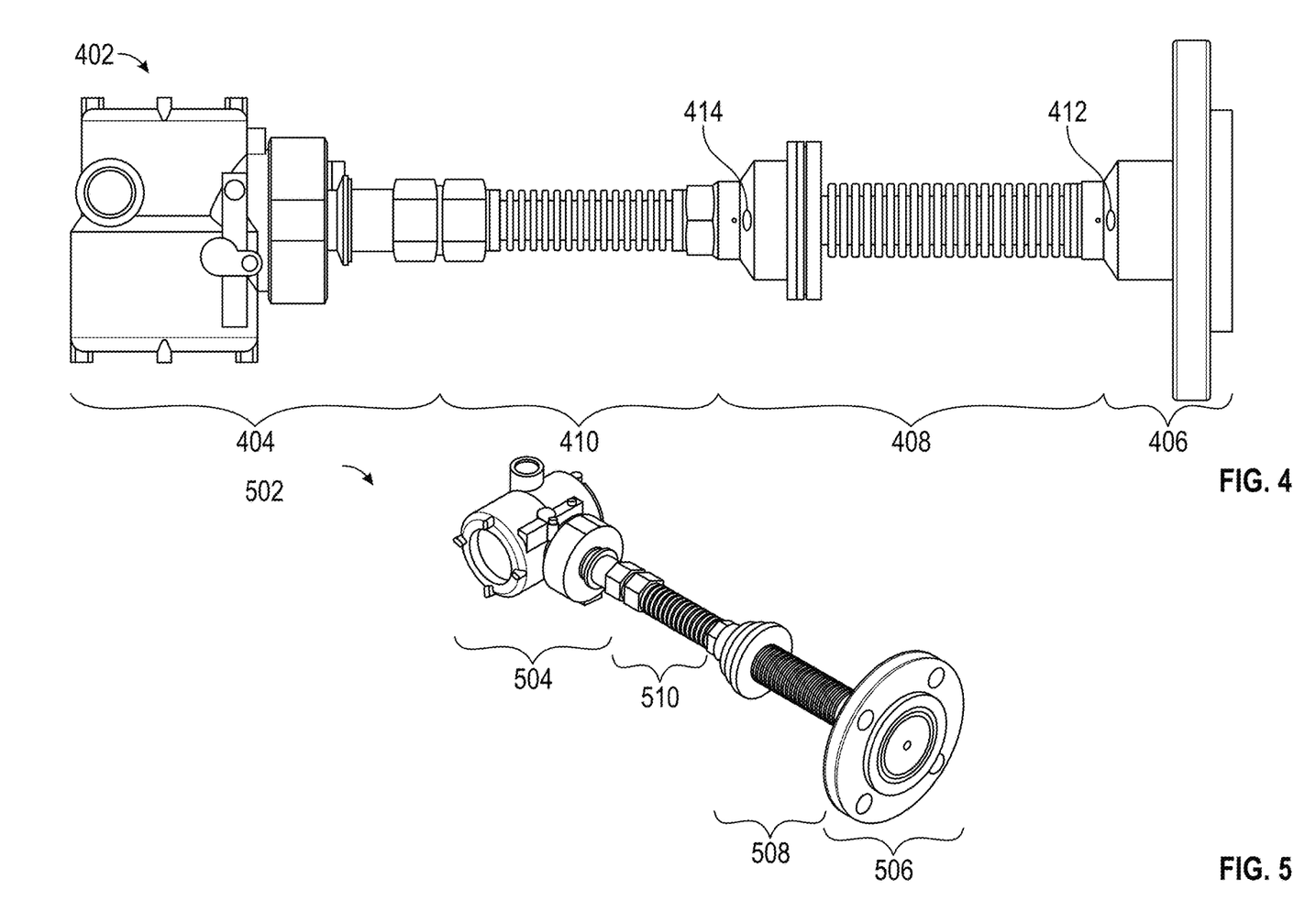
FIG. 4 is a schematic depiction of an embodiment of a system for protecting a pressure measuring instrument from a high temperature, as disclosed herein, shown from a top view.
FIG. 5 is a schematic depiction the embodiment of the system of FIG. 4, shown from an off-axis view.

Referring to FIG. 4 and FIG. 5, in some embodiments, a system 402, 502 for protecting a pressure measuring instrument from a high temperature includes a pressure measuring instrument 404, 504, a diaphragm seal 406, 506, and a temperature isolator 408, 508. In some embodiments, the system can also include an instrument cooling tower 410, 510. In some embodiments, the diaphragm seal can include a liquid metal fill port 412 and a non-metal liquid fill port 414.

Figure 6:
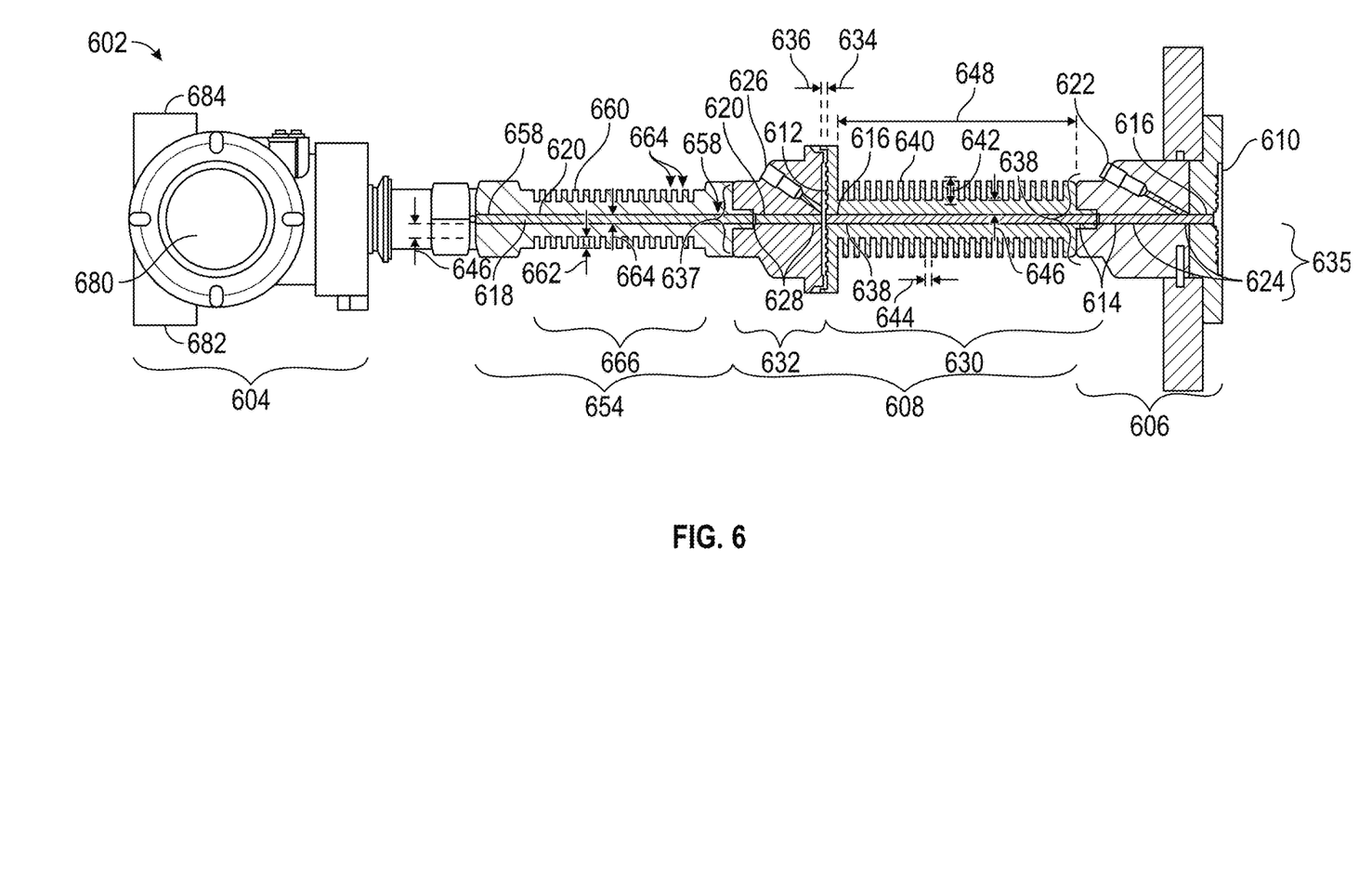
FIG. 6 is a schematic depiction of the embodiment of the system of FIG. 4, including a temperature isolator, shown with a cut away view of the system.

In more detail, referring to FIG. 6, in some embodiments, a system 602 for protecting a pressure measuring instrument 604 from a high temperature includes the pressure measuring instrument 604, a diaphragm seal 606, and a temperature isolator 608, wherein the diaphragm seal contains a proximate diaphragm 610, wherein the temperature isolator contains an isolator diaphragm 612, wherein the diaphragm seal is operatively connected to the isolator diaphragm by a liquid metal alloy 614 in a liquid metal alloy channel 616, and the isolator diaphragm is operatively connected to the pressure measuring instrument by a non-metal liquid 618 in a non-metal liquid channel 620. In some embodiments, the diaphragm seal contains a liquid metal fill port 622 connected to the liquid metal alloy channel and a diaphragm portion 624 of the liquid metal alloy channel extends from the proximate diaphragm to the temperature isolator. In some embodiments, the temperature isolator contains a non-metal liquid fill port 626 connected to the non-metal liquid channel and an isolator portion 628 of the non-metal liquid channel extends from the isolator diaphragm to or toward the pressure measuring instrument.

In some embodiments, the temperature isolator 608 contains an isolator cooling tower 630, a non-metal liquid fill cylinder 632, and the isolator diaphragm 612, wherein the isolator diaphragm is sealed between a sealing face of the isolator cooling tower 634 and a sealing face of the non-metal liquid fill cylinder 636. In some embodiments, the isolator cooling tower contains an isolator portion 638 of the liquid metal alloy channel containing the liquid metal alloy, wherein an internal diameter 939 (see FIG. 9) of the isolator portion of the liquid metal alloy channel in the isolator cooling tower is from about 3.0 mm to about 13.0 mm. In some embodiments, the isolator cooling tower has a series of isolator cooling ridges 640 on an outer surface of the isolator cooling tower and the isolator cooling ridges have a height 642 of from about 6.0 mm to about 17.0 mm and a spacing between the cooling ridges 644 of from about 1.2 mm to about 7.0 mm, and wherein an isolator thickness of the isolator cooling tower 646 from the isolator portion of the liquid metal alloy channel to a bottom of the isolator cooling ridges is from about 25.0 mm to about 75.0 mm. In some embodiments, the isolator cooling tower has a cooling length 648 of from about 25.0 mm to about 105.0 mm. In some embodiments, the non-metal liquid fill cylinder contains an isolator portion of the non-metal liquid channel containing the non-metal liquid, and wherein an internal diameter of the isolator portion of the non-metal liquid channel in the non-metal liquid fill cylinder is from about 0.10 mm to about 13.0 mm. In some embodiments, the isolator portion of the non-metal liquid channel is connected to a non-metal liquid fill port 626.

In some embodiments, the system includes an instrument cooling tower 654, wherein the instrument cooling tower is located between the temperature isolator and the pressure measuring instrument, and the instrument cooling tower contains the non-metal liquid in a tower portion 656 of the non-metal liquid channel, and wherein the tower portion 658 of the non-metal liquid channel that operatively connects the isolator diaphragm of the temperature isolator to the pressure measuring instrument. In some embodiments, a tower internal diameter of the tower portion of the non-metal liquid channel in the instrument cooling tower is from about 3.0 mm to about 13.0 mm. In some embodiments, the instrument cooling tower has a series of tower cooling ridges 660 on an outer surface and the tower cooling ridges have a height 662 of from about 6.0 mm to about 17.0 mm, and wherein a thickness 664 of the instrument cooling tower from the tower portion of the non-metal liquid channel to a bottom of the tower cooling ridges is from about 25.0 mm to about 75.0 mm. In some embodiments, the instrument cooling tower has a tower cooling length 666 of from about 25.0 mm to about 105.0 mm.

In some embodiments of the system, when a liquid with a high temperature exerts pressure against the proximate diaphragm 610, then the proximate diaphragm exerts pressure on the liquid metal alloy 614 in the liquid metal alloy channel. In some embodiments of the system, the liquid metal alloy channel 616 extends from the proximate diaphragm to the isolator diaphragm 612 of the temperature isolator 608, such that when pressure is exerted by the proximate diaphragm on the liquid metal alloy, the liquid metal alloy exerts pressure against the isolator diaphragm. As pressure is exerted by the liquid metal alloy on the isolator diaphragm, the isolator diaphragm exerts pressure against a non-metal liquid 618 contained within the non-metal liquid channel 620. Then, non-metal liquid transfers the pressure from the isolator diaphragm to the pressure measuring instrument. In some embodiments, the pressure measuring instrument has a pressure display 680 and electrical ports 682, 684.

Figure 7:
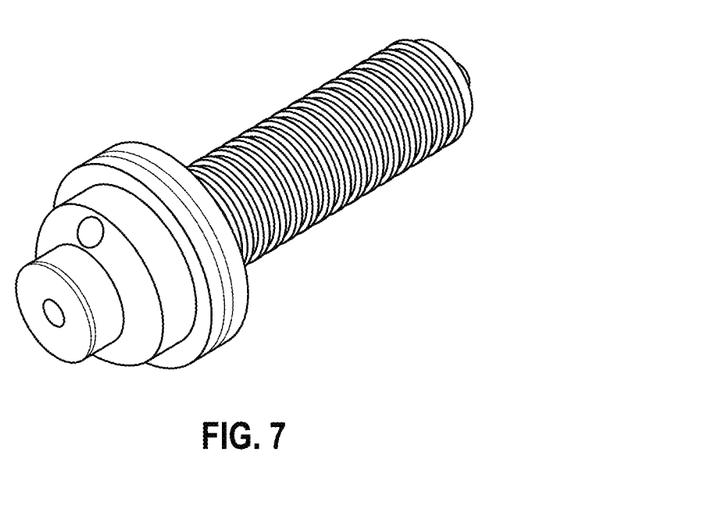
FIG. 7 is a schematic depiction of an embodiment of the temperature isolator from FIG. 6, shown from an off-axis view.
Figure 8:
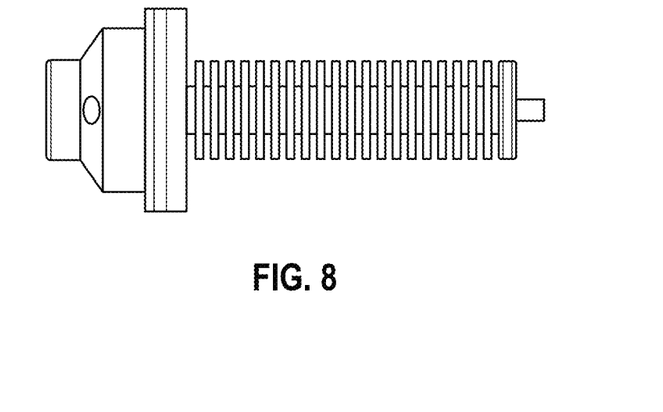
FIG. 8 is a schematic depiction of an embodiment of the temperature isolator from FIG. 6, shown from a top view.

Referring to FIG. 7 and FIG. 8, some embodiments of the temperature isolator can be seen outside of the context of the system for protecting a pressure measuring instrument from a high temperature.

Figure 9:
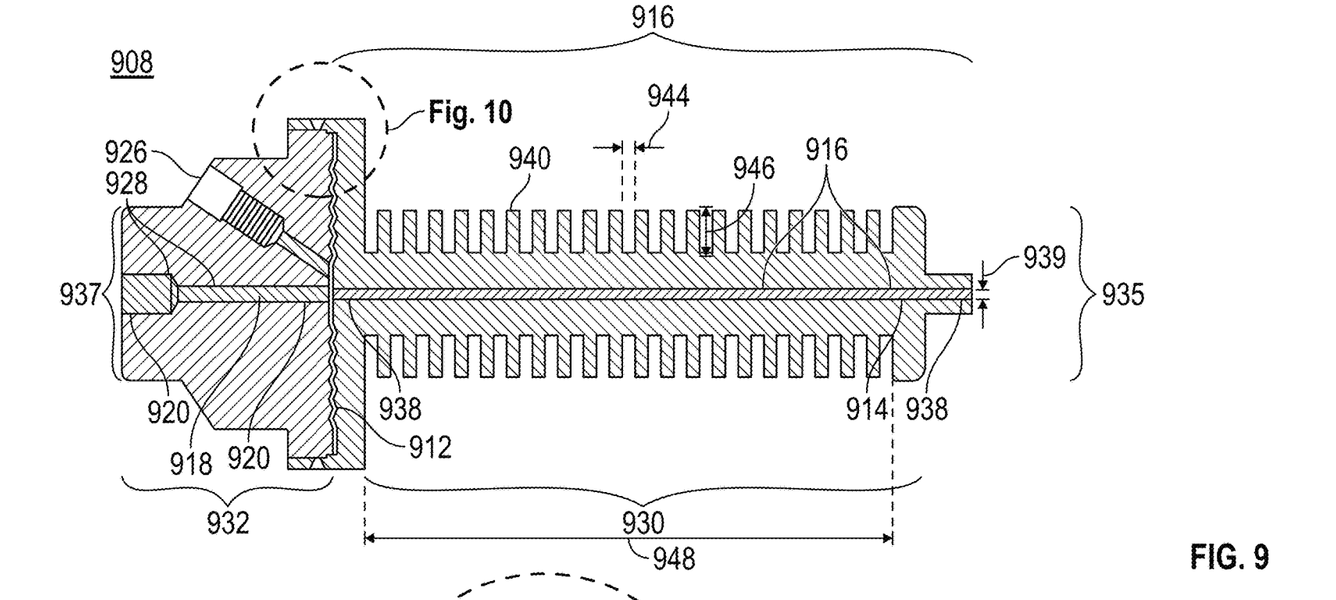
FIG. 9 is a schematic depiction of an embodiment of the temperature isolator from FIG. 6, shown with a cut away view.
Figure 10:
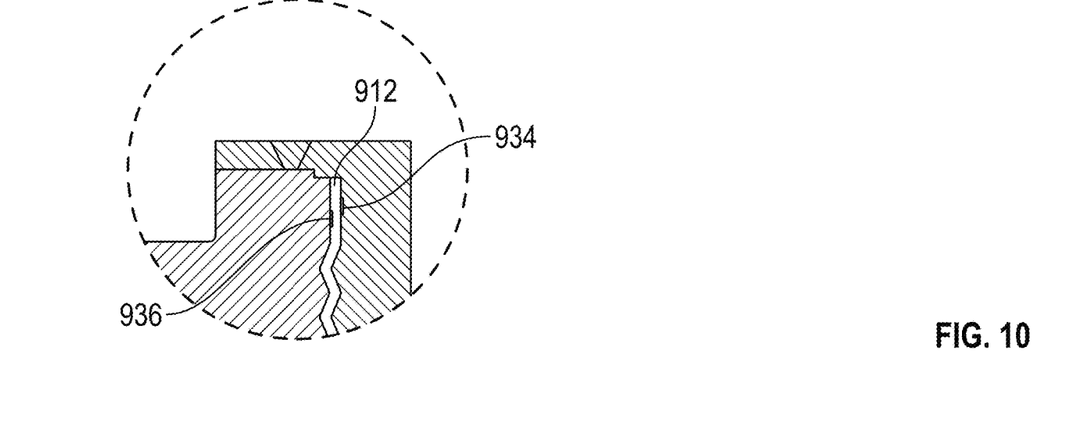
FIG. 10 is a schematic depiction of the embodiment of the temperature isolator of FIG. 9, shown with a magnified view.

Referring to FIG. 9, in some embodiments, the temperature isolator 908 includes a non-metal liquid fill port 926 connected to the non-metal liquid channel 920, containing the non-metal liquid 918, and an isolator portion 928 of the non-metal liquid channel extends from the isolator diaphragm to or toward the pressure measuring instrument. In some embodiments, the temperature isolator contains an isolator cooling tower 930, a non-metal liquid fill cylinder 932, and the isolator diaphragm 912. In some embodiments, the non-metal liquid fill cylinder 932 contains an isolator portion 928 of the non-metal liquid channel that extends from a sealing face of the non-metal liquid fill cylinder 936 through the non-metal liquid fill cylinder to an instrument-side sealing face 937. In some embodiments, the isolator cooling tower 930 contains an isolator portion of the liquid alloy metal channel 916 that extends from a sealing face of the isolator cooling tower 934 through the isolator cooling tower to a diaphragm-side sealing face 935. Referring to FIG. 10, in some embodiments of the system and temperature isolator, the isolator diaphragm 912 is sealed, or double sealed, between the sealing face of the isolator cooling tower 934 and the sealing face of the non-metal liquid fill cylinder 936.

Referring to FIG. 9, in some embodiments, the isolator cooling tower contains an isolator portion 938 of the liquid metal alloy channel 916 containing the liquid metal alloy 914, wherein an internal diameter 939 of the isolator portion of the liquid metal alloy channel in the isolator cooling tower is from about 3.0 mm to about 13.0 mm. In some embodiments, the isolator cooling tower has a series of isolator cooling ridges 940 on an outer surface of the isolator cooling tower and the isolator cooling ridges have a height 942 of from about 6.0 mm to about 17.0 mm and a spacing between the cooling ridges 944 of from about 1.2 mm to about 7.0 mm, and wherein an isolator thickness of the isolator cooling tower 946 from the isolator portion of the liquid metal alloy channel to a bottom of the isolator cooling ridges is from about 25.0 mm to about 75.0 mm. In some embodiments, the isolator cooling tower has an isolator cooling length 948 of from about 25.0 mm to about 105.0 mm.

In some embodiments of the system, the term "high temperature" or "high temperatures" refers to a temperature of a liquid in a pipe or vessel having a temperature of from about 400° C. to about 1,200° C., including from about 400° C. to about 1,000° C., including from about 500° C. to about 1,000° C., including from about 500° C. to about 800° C.

In some embodiments of the system, the non-metal liquid is a petroleum-based oil, a hydrocarbon oil, a silicone oil, or a hydrocarbon liquid, wherein the non-metal liquid is a liquid under conditions of 1 atmosphere and 20.0° C., and wherein the non-metal liquid contains from 0.0 to about 1.0% by weight of metal, including 0.1 to about 0.5% by weight of a metal, based on a total weight of the non-metal liquid. Suitable non-metal liquids include silicone oil or propylene glycol.

In some embodiments, the internal diameter of the isolator portion of the liquid metal alloy channel in the isolator cooling tower is from about 3.0 mm to about 13.0 mm, including 5.0 mm to 11.0 mm. If the internal diameter of the isolator portion falls below about 3.0 mm, then the pressure measurements become inaccurate. If the internal diameter of the isolator portion passes above about 13.0 mm, then the ability of the liquid metal alloy to efficiently dissipate heat can be lost or severely reduced. In some embodiments, the isolator cooling tower has a series of isolator cooling ridges on an outer surface of the isolator cooling tower and the isolator cooling ridges have a height of from about 6.0 mm to about 17.0 mm, including 8.0 mm to 15.0 mm, and a spacing between the cooling ridges of from about 1.2 mm to about 7.0 mm, including from 2.0 mm to 5.0 mm. In some embodiments, an isolator thickness of the isolator cooling tower from the isolator portion of the liquid metal alloy channel to a bottom of the isolator cooling ridges is from about 25.0 mm to about 75.0 mm, including about 35 mm to about 65.00 mm. In some embodiments, the isolator cooling tower has an isolator cooling length of from about 25.0 mm to about 105.0 mm, including about 30.0 mm to about 95 mm. If the isolator cooling ridges have a height that passes below 6.0 mm, or the spacing between the cooling ridges passes below about 1.2 mm, or the isolator thickness of the isolator cooling tower pass below about 25.0 mm, or the isolator cooling tower has an isolator cooling length that passes below about 25.0 mm, then ability of the temperature isolator to dissipate heat will be lost or severely reduced. If the isolator cooling ridges have a height that passes above about 17.0 mm, or the spacing between the cooling ridges passes above about 7.0 mm, or the isolator thickness of the isolator cooling tower pass above about 75.0 mm, or the isolator cooling tower has a cooling tower length that passes above about 105.0 mm, then the ability of the temperature isolator to be integrated with existing technology may be impermissibly prevented or severely reduced.

In some embodiments, the internal diameter of the isolator portion of the non-metal liquid channel in the non-metal liquid fill cylinder is from about 0.10 mm to about 13.0 mm, including from about 0.5 mm to about 10.0 mm. If the internal diameter of the isolator portion of the non-metal liquid channel passes below about 0.5 mm, then the pressure measurements through the channel become inaccurate. If the internal diameter of the isolator portion of the non-metal liquid channel passes above about 13.0 mm, then the ability of the non-metal liquid to efficiently dissipate heat can be lost or severely reduced.

In some embodiments, isolator diaphragm is made of an isolator diaphragm material and has a corrugated shape, wherein the isolator diaphragm material includes a steel alloy, a nickel alloy, a silver alloy, a tantalum alloy, a titanium alloy, or a zirconium alloy, or a combination or alloy thereof. In some embodiments, the isolator diaphragm has a thickness of from about 0.02 mm to about 0.25 mm, including from about 0.021 mm to about 0.24 mm. If the isolator diaphragm has a thickness that passes below about 0.02 mm or above about 0.25 mm, the ability of the isolator diaphragm to accurately transmit pressure from the liquid metal alloy to the non-metal liquid will be lost or severely reduced. In some embodiments, proximate diaphragm and the isolator diaphragm can be the same or different.

In some embodiments of the system and temperature isolator, the instrument-side sealing face has a shape complementary to or adapted to fit a neighboring instrument-side module, such as an instrument cooling tower, a metal fitting, a metal adapter, or a capillary metal line. In some embodiments of the system and temperature isolator, the diaphragm-side sealing face has a shape complementary to or adapted to fit a diaphragm seal or a neighboring diaphragm side module, such as a diaphragm spacer.

In some embodiments, the liquid metal alloy refers to a metal alloy that is a liquid at 1 atmosphere and 20.0° C., and that contains from about 95.0% to 100% by weight metal, based on a total weight of the liquid metal alloy. In some embodiments, the liquid metal alloy includes: from about 65.0% to about 75.0% gallium by weight, including from about from about 68.0% to about 72.0% gallium by weight, and from about 15.0% to about 25.0% indium by weight, including from about from about 18.0% to about 22.0% indium by weight, and from about 5.0% to about 15.0% tin by weight, including from about 8.0% to about 12.0% tin, based on a total weight of the liquid metal alloy. If the composition of the liquid metal alloy passes outside of these ranges, then the ability of the liquid metal alloy to withstand and function when the system is exposed to liquid temperatures of 400 degrees Celsius or more can be lost or severely diminished. Suitable liquid metal alloys include GALINSTAN®.

In some embodiments, the system for protecting a pressure measuring instrument from a high temperature does not include or excludes an instrument cooling tower. In some embodiments, the temperature isolator connects directly to the pressure measuring instrument. In some embodiments, the system includes a metal fitting, a metal adapter, or a capillary metal line, wherein the capillary metal line includes a metal tubing, wherein the metal fitting, the metal adapter, or the capillary metal line, contains a spacer portion of the non-liquid metal channel and operatively connects the non-metal liquid and/or non-metal liquid channel of the temperature isolator to the pressure measuring instrument. Generally, the non-metal liquid channel of the temperature isolator needs to connect to the pressure measuring instrument to transmit pressure from the isolator diaphragm to the pressure measuring instrument, but the particular route or components between the temperature isolator and the pressure measuring instrument are not generally limited. A benefit of this flexibility of design allows for the system, including the temperature isolator, to be integrated into a variety of different conventional diaphragm seal systems.

In some embodiments, the system for protecting a pressure measuring instrument from a high temperature includes a diaphragm seal and a temperature isolator. In some embodiments, the system for protecting a pressure measuring instrument from a high temperature includes a temperature isolator, as shown in FIGS. 7, 8, 9, and 10 and discussed herein. In some embodiments, a kit is disclosed wherein the kit includes an isolator cooling tower, a non-metal liquid fill cylinder, and an isolator diaphragm, and optionally a liquid metal alloy and/or a non-metal fill cylinder. In some embodiments of the system and the methods of assembling the system, the temperature isolator can be inserted into an otherwise conventional diaphragm seal system, transforming that system into a system capable of protecting a pressure measuring instrument from a high temperature.

A method of assembling a system for protecting a pressure measuring instrument from a high temperature is disclosed herein. Referring to FIG. 6, in some embodiments, the method includes providing the pressure measuring instrument 604, a diaphragm seal 606, and a temperature isolator 608, wherein the diaphragm seal contains a proximate diaphragm 610, wherein the temperature isolator contains an isolator diaphragm 612, wherein the diaphragm seal is operatively connected to the isolator diaphragm by a liquid metal alloy channel 616, and the isolator diaphragm is operatively connected to the pressure measuring instrument by a non-metal liquid channel 620; and forming the system 602 for protecting a pressure measuring instrument by, in any order or simultaneously, adding a liquid metal alloy 614 to the liquid metal alloy channel, and adding a non-metal liquid 618 to the non-metal liquid channel. In an embodiment, the method includes adding a liquid metal alloy to the liquid metal alloy channel before adding a non-metal liquid to the non-metal liquid channel. In an embodiment, the method includes adding a non-metal liquid to the non-metal liquid channel before adding a liquid metal alloy to the liquid metal alloy channel. In an embodiment, the method includes adding a liquid metal alloy to the liquid metal alloy channel at the same or substantially the same time as a step of adding a non-metal liquid to the non-metal liquid channel.

In some embodiments, the method includes before adding the liquid metal alloy or the non-metal liquid, providing the pressure measuring instrument 604. In some embodiments, the method includes providing a diaphragm seal 606, wherein the diaphragm seal contains a diaphragm portion 624 of a liquid metal alloy channel 616. In some embodiments, the method includes providing an isolator cooling tower 630, wherein isolator cooling tower contains an isolator portion of a liquid metal alloy channel 638 that extends from a sealing face of the isolator cooling tower 634 to a diaphragm-side sealing face 635. In some embodiments, the method includes providing a non-metal liquid fill cylinder 632, wherein the non-metal liquid fill cylinder contains an isolator portion of a non-metal liquid channel 628 that extends from a sealing face of the isolator cooling tower 636 to or toward the pressure measuring instrument, ending in an instrument-side sealing face 637. In some embodiments, the method includes providing an isolator diaphragm 612. In some embodiments, the method includes forming a temperature isolator 608 by sealing the isolator diaphragm 612 between the tower sealing face of the isolator cooling tower 634 and the cylinder sealing face of the non-metal liquid fill cylinder 634.

In some embodiments, the method includes, before, during, or after forming the temperature isolator, connecting the isolator portion of a liquid metal alloy channel to the diaphragm portion of the liquid metal alloy channel. In some embodiments, the method includes connecting the isolator portion of the non-metal liquid channel to the pressure measuring instrument, directly or indirectly. In some embodiments, the method includes, in any order or simultaneously, connecting the isolator portion of a liquid metal alloy channel to the diaphragm portion of the liquid metal alloy channel and connecting the isolator portion of the non-metal liquid channel to the pressure measuring instrument, directly or indirectly.

EXAMPLES

A pressure measuring instrument (Yokogawa EJA530E) can be commercially purchased from Yokogawa (Tokyo, Japan). An instrument cooling tower (Cooling Tower 4" (10 cm), 8 mm Proc. Conn, ½" (1.27 cm) NPTW Instr. Conn) can be commercially purchased from Haygor Instrument & Company, Inc. (Houston, Texas). A diaphragm seal (HFF-AWS620AS6S6NNN—heat zone hot) can be commercially purchased from Haygor Instrument & Company, Inc. (Houston, Texas). An isolator cooling tower, a non-metal liquid fill cylinder, and an isolator diaphragm can be manufactured by Haygor Instrument & Company, Inc. or commercially purchased from Haygor Instrument & Company, Inc.

The system for protecting a pressure measuring instrument from a high temperature can be formed by welding, bolting, or threading the diaphragm seal into contact with a pipe (with the hot liquid turned off). The instrument cooling tower can be welded to the pressure measuring instrument. The temperature isolator can be formed by pressing the isolator cooling tower and the non-metal liquid fill cylinder together with the isolator diaphragm located between them. The inner diameter of the isolator cooling tower and the non-metal liquid fill cylinder can be Tungsten Inert Gas (TIG) welded together to form an inner seal. The outer diameter of the isolator cooling tower and the non-metal liquid fill cylinder can be Tungsten Inert Gas (TIG) welded to form a second, outer seal. The assembled temperature isolator can be inserted between the instrument cooling tower and the diaphragm seal and the aligned ends can be TIG welded together to connect the liquid metal alloy channels and the non-metal liquid channels. The system can be formed by adding the liquid metal alloy to the liquid metal fill port and adding the non-metal liquid to the non-metal liquid fill port. The temperature isolator assembly is assembled by TIG welding the metal diaphragm to the temperature isolator component containing the cooling fins on the side with matched convolutions, then the temperature isolator component containing the cooling tower and the TIG welded diaphragm is TIG welded to the temperature isolating component containing the fill plug on the outer diameter thus creating the single piece temperature isolator assembly.

What is claimed is:

1. A system for protecting a pressure measuring instrument from a high temperature comprising:
   the pressure measuring instrument, a diaphragm seal, and a temperature isolator,
   wherein the diaphragm seal contains a proximate diaphragm,
   wherein the temperature isolator contains an isolator diaphragm,
   wherein the diaphragm seal is operatively connected to the isolator diaphragm by a liquid metal alloy in a liquid metal alloy channel, and the isolator diaphragm is operatively connected to the pressure measuring instrument by a non-metal liquid in a non-metal liquid channel,
   wherein the temperature isolator includes an isolator cooling tower,
   wherein the isolator cooling tower contains an isolator portion of the liquid metal alloy channel containing the liquid metal alloy,
   wherein an internal diameter of the isolator portion of the liquid metal alloy channel in the isolator cooling tower is from about 3.0 mm to about 13.0 mm, and
   wherein the liquid metal alloy includes gallium.

2. The system of claim 1, wherein the diaphragm seal contains a liquid metal fill port connected to the liquid metal alloy channel and a diaphragm portion of the liquid metal alloy channel extends from the proximate diaphragm to the temperature isolator.

3. The system of claim 1, wherein the temperature isolator contains a non-metal liquid fill port connected to the non-metal liquid channel and an isolator portion of the non-metal liquid channel extends from the isolator diaphragm to or toward the pressure measuring instrument.

4. The system of claim 1, wherein the temperature isolator contains a non-metal liquid fill cylinder, and the isolator diaphragm, wherein the isolator diaphragm is sealed between a sealing face of the isolator cooling tower and a sealing face of the non-metal liquid fill cylinder.

5. The system of claim 4,
wherein the isolator cooling tower has a series of isolator cooling ridges on an outer surface of the isolator cooling tower and the isolator cooling ridges have a height of from about 6.0 mm to about 17.0 mm and a spacing between the cooling ridges of from about 1.2 mm to about 7.0 mm, and wherein an isolator thickness of the isolator cooling tower from the isolator portion of the liquid metal alloy channel to a bottom of the isolator cooling ridges is from about 25.0 mm to about 75.0 mm.

6. The system of claim 4, wherein the non-metal liquid fill cylinder contains an isolator portion of the non-metal liquid channel containing the non-metal liquid, and
wherein an internal diameter of the isolator portion of the non-metal liquid channel in the non-metal liquid fill cylinder is from about 0.10 mm to about 13.0 mm, or
wherein the isolator portion of the non-metal liquid channel is connected to a non-metal liquid fill port.

7. The system of claim 4, wherein the isolator diaphragm is made of an isolator diaphragm material, and the isolator diaphragm material includes a steel alloy, a nickel alloy, a silver alloy, a tantalum alloy, a titanium alloy, or a zirconium alloy, or a combination or alloy thereof; or
wherein the isolator diaphragm has a thickness of from about 0.02 mm to about 0.25 mm.

8. The system of claim 1, wherein the liquid metal alloy includes:
from about 65.0% to about 75.0% gallium by weight and from about 15.0% to about 25.0% indium by weight, based on a total weight of the liquid metal alloy; or
from about 65.0% to about 75.0% gallium by weight and about 5.0% to about 15.0% tin by weight, based on a total weight of the liquid metal alloy; or
from about 15.0% to about 25.0% indium by weight and about 5.0% to about 15.0% tin by weight, based on a total weight of the liquid metal alloy; or
wherein the liquid metal alloy includes indium, and tin, or a combination or alloy thereof.

9. The system of claim 1, further comprising:
an instrument cooling tower, wherein the instrument cooling tower is located between the temperature isolator and the pressure measuring instrument, and the instrument cooling tower contains the non-metal liquid in a tower portion of the non-metal liquid channel, and
wherein the tower portion of the non-metal liquid channel operatively connects the temperature isolator to the pressure measuring instrument; or
wherein a tower internal diameter of the tower portion of the non-metal liquid channel in the instrument cooling tower is from about 3.0 mm to about 13.0 mm; or
wherein the instrument cooling tower has a series of tower cooling ridges on an outer surface and the tower cooling ridges have a height of from about 6.0 mm to about 17.0 mm, and wherein a thickness of the instrument cooling tower from the tower portion of the non-metal liquid channel to a bottom of the tower cooling ridges is from about 25.0 mm to about 75.0 mm; or
wherein the instrument cooling tower has a length of from about 25.0 mm to about 105.0 mm.

10. The system of claim 1, wherein the temperature isolator connects directly to the pressure measuring instrument; or
further comprising a metal fitting, a metal adapter, or a capillary metal line, wherein the capillary metal line includes a metal tubing,
wherein the metal fitting, the metal adapter, or the capillary line, contains a spacer portion of the non-liquid metal channel and operatively connects the non-metal liquid of the temperature isolator to the pressure measuring instrument.

11. The system of claim 1, wherein the isolator cooling tower has a length of from about 25.0 mm to about 105.0 mm.

12. A method of assembling a system for protecting a pressure measuring instrument from a high temperature comprising:
providing the pressure measuring instrument, a diaphragm seal, and a temperature isolator,
wherein the diaphragm seal contains a proximate diaphragm,
wherein the temperature isolator contains an isolator diaphragm,
wherein the diaphragm seal is operatively connected to the isolator diaphragm by a liquid metal alloy channel, and the isolator diaphragm is operatively connected to the pressure measuring instrument by a non-metal liquid channel,
wherein the temperature isolator includes an isolator cooling tower,
wherein the isolator cooling tower contains an isolator portion of the liquid metal alloy channel containing the liquid metal alloy, and
wherein an internal diameter of the isolator portion of the liquid metal alloy channel in the isolator cooling tower is from about 3.0 mm to about 13.0 mm; and
forming the system for protecting the pressure measuring instrument by adding a liquid metal alloy to the liquid metal alloy channel, and
adding a non-metal liquid to the non-metal liquid channel,
wherein the liquid metal alloy includes gallium.

13. The method of claim 12, further comprising:
before adding the liquid metal alloy or the non-metal liquid,
providing the pressure measuring instrument;
providing a diaphragm seal, wherein the diaphragm seal contains a diaphragm portion of a liquid metal alloy channel;
providing an isolator cooling tower, wherein isolator cooling tower contains an isolator portion of a liquid metal alloy channel that extends from a sealing face of the isolator cooling tower through the isolator cooling tower to a diaphragm-side sealing face;
providing a non-metal liquid fill cylinder, wherein the non-metal liquid fill cylinder contains an isolator portion of a non-metal liquid channel that extends from a sealing face of the non-metal liquid fill cylinder through non-metal liquid fill cylinder to an instrument-side sealing face;
providing an isolator diaphragm;
forming a temperature isolator by sealing the isolator diaphragm between the sealing face of the non-metal liquid fill cylinder and the sealing face of the isolator cooling tower.

14. The method of claim 13, further comprising,
before, during, or after forming the temperature isolator,
connecting the isolator portion of a liquid metal alloy channel to the diaphragm portion of the liquid metal alloy channel; and
connecting the isolator portion of the non-metal liquid channel to the pressure measuring instrument, directly or indirectly.

* * * * *